United States Patent [19]
Kitchen et al.

[11] Patent Number: 5,704,595
[45] Date of Patent: Jan. 6, 1998

[54] NESTABLY STACKABLE FORMED WIRE FOUNDATION

[75] Inventors: John P. Kitchen, Georgetown; Upton Dabney, Lexington, both of Ky.

[73] Assignee: L& P Property Management Company, Chicago, Ill.

[21] Appl. No.: 520,496

[22] Filed: Aug. 29, 1995

[51] Int. Cl.$^6$ .................... A47C 23/00; F16F 3/06
[52] U.S. Cl. .................................. 267/103; 5/247
[58] Field of Search ..................... 267/91, 92, 103, 267/107, 110; 5/247, 255, 256, 260–262, 268

[56] References Cited

U.S. PATENT DOCUMENTS

| | | |
|---|---|---|
| 3,561,021 | 2/1971 | Slominski . |
| 3,722,013 | 3/1973 | Suvletta .................. 5/247 |
| 3,725,965 | 4/1973 | Smith et al. . |
| 3,852,838 | 12/1974 | Slominski et al. ........... 5/247 |
| 4,120,058 | 10/1978 | Kitchen et al. ........... 5/255 |
| 4,488,712 | 12/1984 | Higgias ................ 267/91 |
| 4,555,097 | 11/1985 | Hiatt . |
| 4,657,231 | 4/1987 | Suvletta .................. 5/247 |
| 4,891,853 | 1/1990 | Dabney ................... 5/247 |
| 4,903,949 | 2/1990 | Schulz, Jr. . |
| 5,052,064 | 10/1991 | Hagemeister et al. . |
| 5,346,188 | 9/1994 | Rodgers et al. . |
| 5,361,434 | 11/1994 | Hagemeister et al. . |

*Primary Examiner*—Robert J. Oberleitner
*Assistant Examiner*—Chris Schwartz
*Attorney, Agent, or Firm*—Wood, Herron & Evans, L.L.P.

[57] ABSTRACT

A nestably stackable pre-assembly for a box spring foundation having a top support surface formed by a substantially rectangular border wire, lateral surface support wires and longitudinal surface support wires. The top support surface is supported by a series of longitudinal formed wire structural support members having V-shaped sections extending down from the top support surface. The structural support members are attached to the surface support wires by clips. The V-sections of adjacent structural support members are angled towards each other in pairs such that they form a series of four-sided open-apex pyramids. The pre-assemblies can be stored and shipped by attaching a first pre-assembly to a bottom wooden frame, and stacking additional pre-assemblies on top of the first.

35 Claims, 10 Drawing Sheets

NESTABLY STACKABLE FORMED WIRE FOUNDATION

BACKGROUND

1. Field of the Invention

The present invention relates to box spring foundations used for the support of upholstered mattresses.

2. Background of the Invention

Box spring mattress foundations generally include a wooden bottom frame, and an array of individual cots supporting a top grid of wires, as disclosed, e.g., in U.S. Pat. No. 3,725,965. The top grid of wires form the top support surface of the assembly. The foundations are finally assembled by placing a pad over the top grid of each box spring, and upholstering the complete frame/coils/grid/pad assembly under compression.

Because conventional box spring assemblies occupy a large volume, nestably stackable assemblies provide substantial economies during shipping and storage. U.S. Pat. Nos. 5,052,064 and 5,361,434, disclose a nestably stackable foundation in which the top grid comprises a rectangular border wire and corrugated support wires. The top portions of the corrugated support wires are generally coplanar with the rectangular border wire. The bottom portions of the corrugated support wires extend substantially below the plane of the rectangular border wire, and are attached to the slats of the bottom frame.

An alternative to nestably stackable assemblies is the hinged wire assembly disclosed in U.S. Pat. No. 5,346,188. That assembly includes hingeably-connected wire form support members that are folded down to allow compact storage or shipping of the box spring assemblies. After storage or shipping, the wire form support members are rotated down, to an angle less than 90°, and are assembled to the wooden frame to form a rigid structure.

SUMMARY OF THE INVENTION

The present invention is a nestably stackable box spring pre-assembly comprised of three components: (1) a wire grid forming the top surface of the foundation; (2) formed wire support members (the "structural support wires"); and (3) clips attaching the structural support wire to the wire grid. The structural support wires provide the structural support for the top surface of the pre-assembly. It is preferably manufactured from spring wire.

The pre-assembly does not include a bottom wooden frame. After one box spring pre-assembly is attached to a bottom wooden frame, additional pre-assemblies (not attached to wooden frames) can be nestably stacked on top of the bottom box spring pre-assembly. After shipping and storage, the pre-assemblies are unstacked, and the assembly of each box spring foundation is completed by attaching its structural support wire to a wooden frame just prior to upholstering the box spring foundation, as described above with respect to conventional box springs (except for the bottom pre-assembly, which was attached prior to shipping and/or storing).

Figure 1A:
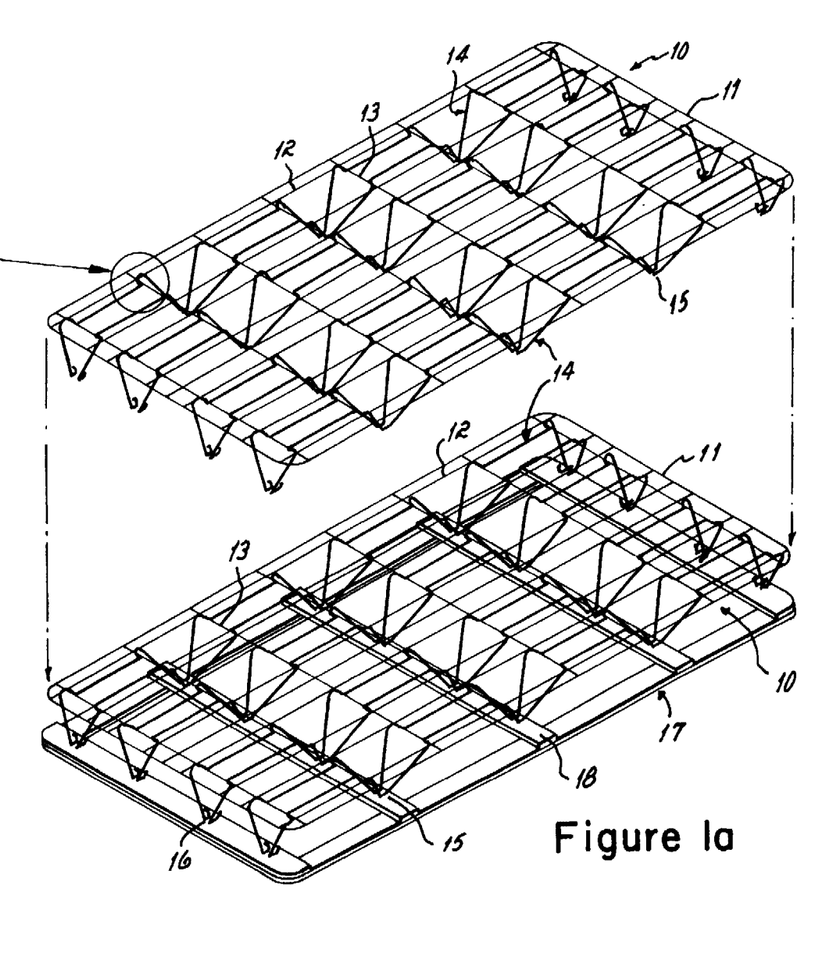
FIG. 1a is a schematic diagram of two nestably stackable box spring pre-assemblies.

FIG. 1a is a schematic diagram showing two nestably stackable box spring pre-assemblies of a first preferred embodiment of the present invention. A second box spring pre-assembly is being nestably stacked on top of a first box spring pre-assembly. As discussed above, the first box spring pre-assembly (which is at the bottom of the stack) has already been attached to a bottom wooden frame. The top support surface of each box spring pre-assembly is formed by a rectangular wire grid array. The structural support wires, which support the top surface of the pre-assembly, extend down from the top support surface at an angle less than 90°, i.e., the plane formed or defined by each structural support wire is at an angle that is significantly less than 90° with respect to the plane formed by the top support surface. The angle is preferably between about 45° and about 75°. More preferably, the angle ranges from about 60° to about 70°. As shown in FIG. 1a, laterally adjacent support members are angled towards each other in pairs, forming a series of four-sided pyramid structures with open apexes and sides. The base of each pyramid is in the top support surface, and the apex of each pyramid is at the bottom of the pre-assembly, i.e., the pre-assemblies are attached to the wooden frames by attaching the apexes of the pyramids to the wooden frames.

Figure 1B:
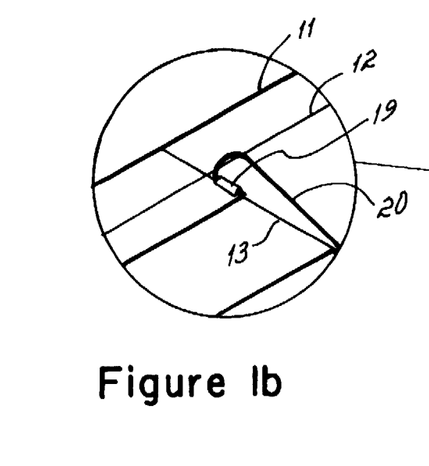
FIG. 1b is a detail of FIG. 1a, showing how the structural support wire is bent at a right angle for a short lateral segment, such that it can be clipped to a lateral support wire.

FIG. 1b, as well as FIG. 1a and FIG. 4a (discussed below) shows that, in the preferred embodiment of the present invention, immediately after each V in the structural support wire, the structural support wire formed wire is bent laterally at 90° to form a relatively short lateral segment, then bent back parallel to the longitudinal wire to form a relatively long longitudinal offset segment. As shown in FIG. 1b, in a preferred embodiment of the present invention, clips are used on the short lateral segments to attach the structural support wire to lateral wires in the top support surface. The length of the longitudinal offset segments matches the spacing between the lateral wires in the top support surface.

Figure 2A:
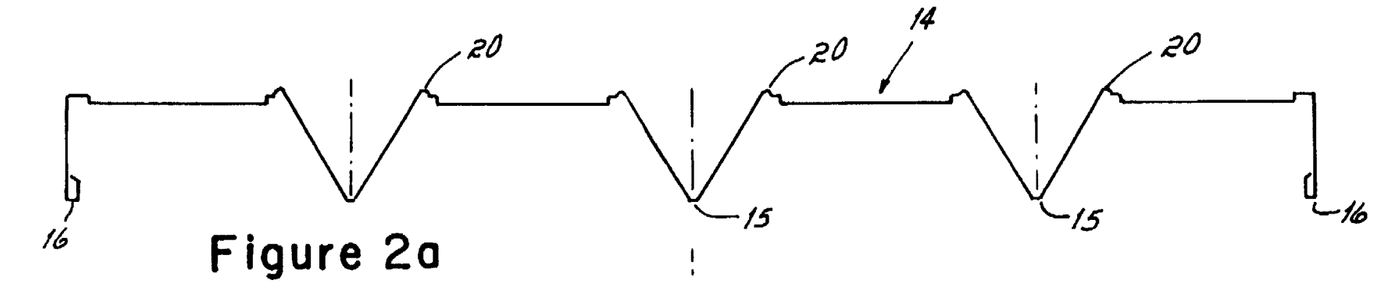
FIG. 2a is a side view of a structural support wire, designed for use with a three-slat wooden frame.
Figure 2B:
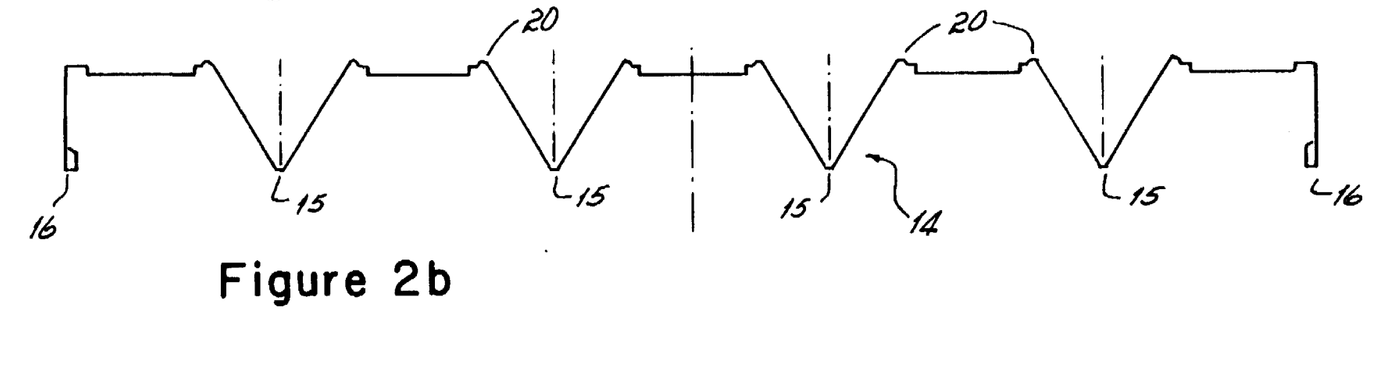
FIG. 2b is a side view of a structural support wire, designed for use with a four-slat wooden frame.

FIGS. 2a–2b are schematic diagrams of the single formed wire forming one structural support wire. In the example shown in FIG. 2a, the structural support wire has one end support member on the right side of the pre-assembly, three interior V-shaped support members at the interior of the assembly, and another end support member on the left side of the assembly. The example of FIG. 2a would be used with three wooden slats running laterally across the bottom wooden frame. FIG. 2b shows a four-slat example of the structural support wire. FIGS. 2a and 2b show that the number of interior support members can be varied to produce a box spring foundation having any desirable length and number of lateral supports. The size and number of the V-shaped support members of the structural support wire is a design choice.

Figure 3A:
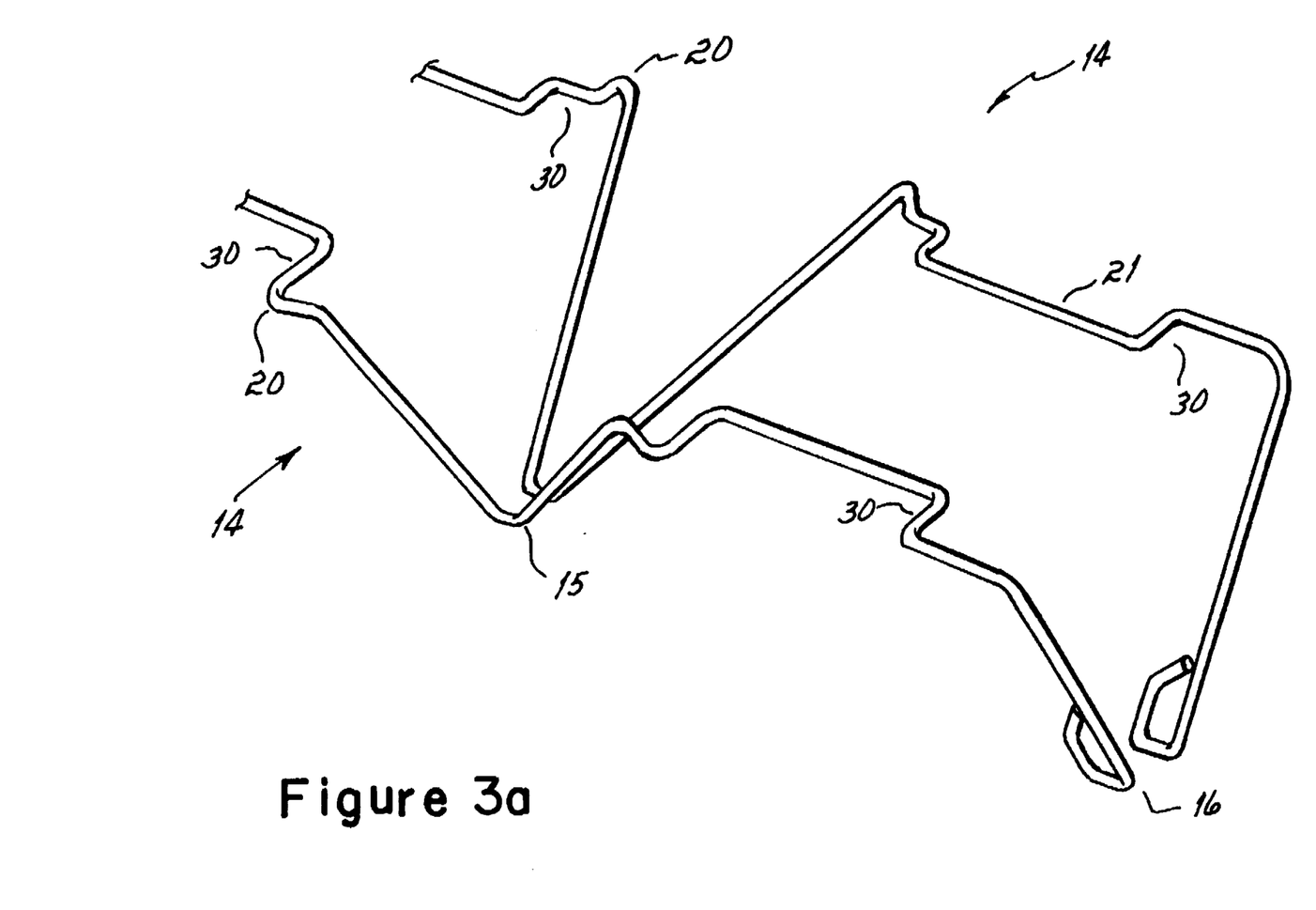
FIGS. 3a and 3b are perspective views of two adjacent structural support wires.
Figure 3B:
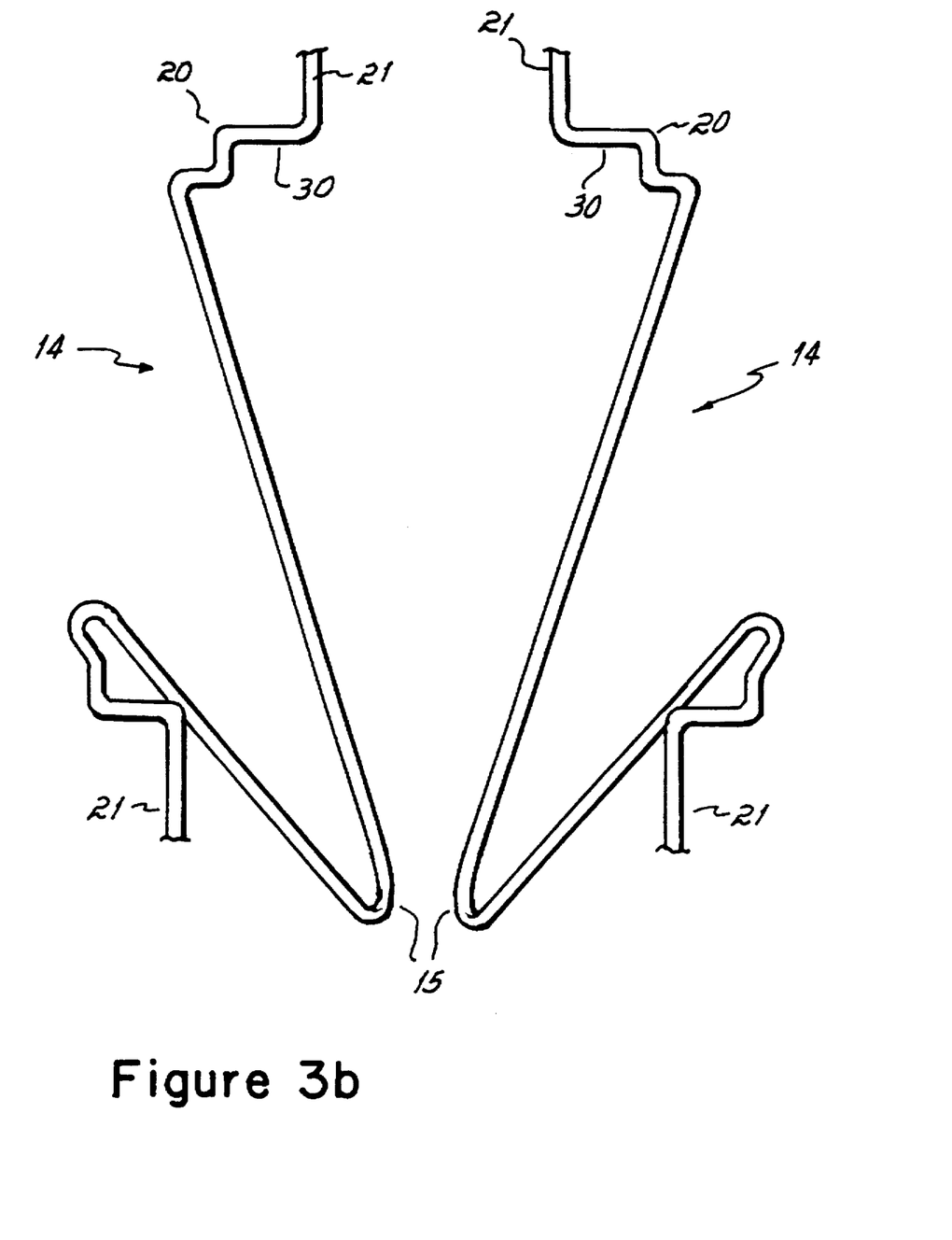

FIG. 3a is mainly a top side perspective view of two adjacent structural support wires, and FIG. 3b is a top front perspective view of the two adjacent support wires. These Figures show that each set of adjacent structural support wires is oriented such that the lateral spacing between the structural support wires is much wider at the top than at the bottom, such that the V members form the series of open-apex four-sided pyramid structures discussed above with respect to FIG. 1a.

Figure 4A:
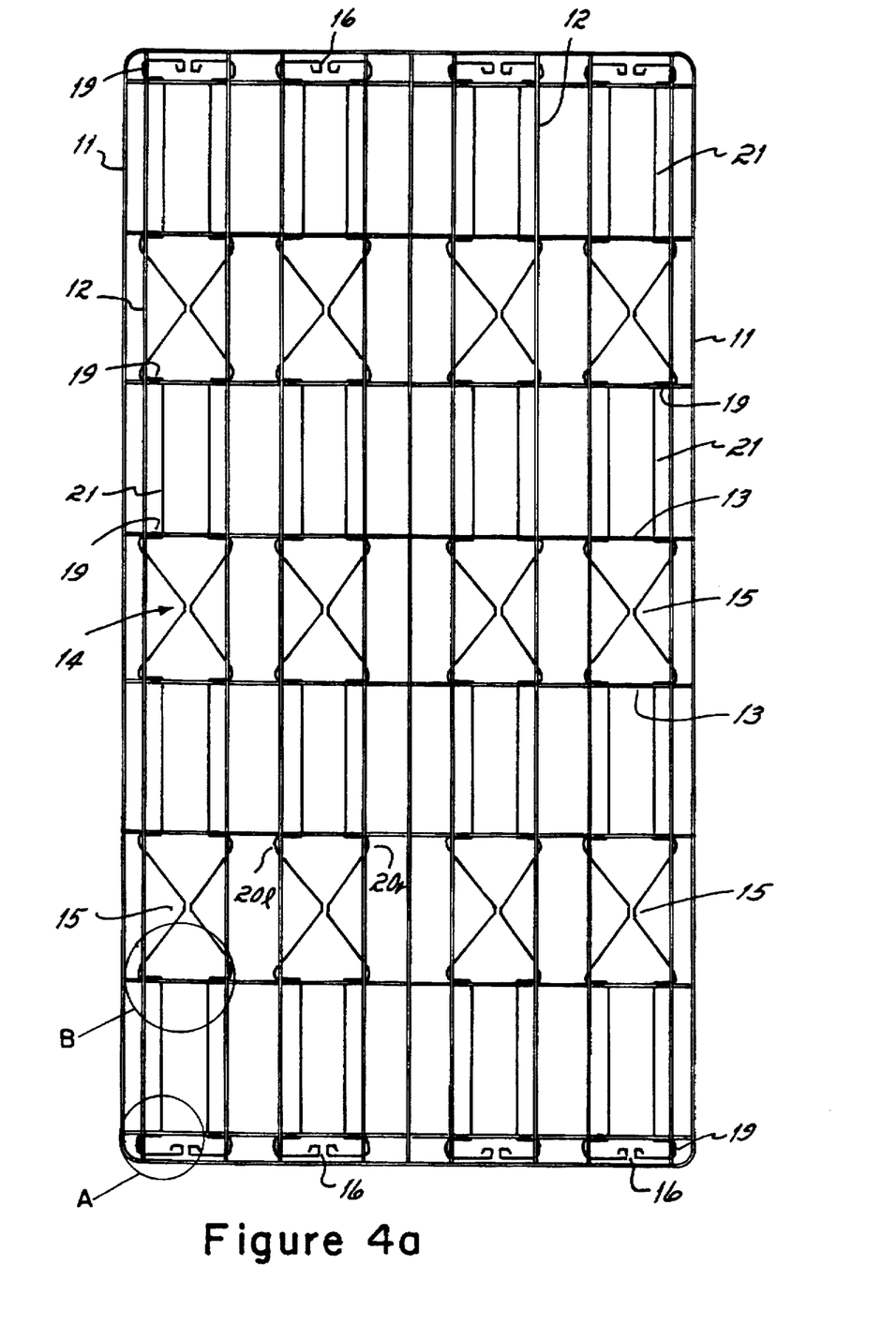
FIG. 4a is a top view of a three-slat pre-assembly stackable box spring.

FIG. 4a is a top view of a three-slat pre-assembly, that could be used for twin-sized bed of standard length. FIG. 4a shows how the structural support wires are angled towards each other as they extend down from the top support surface. FIG. 4a also shows that the short lateral segments of the structural support wires are attached to the lateral wires in the top surface at the interior of the assembly. At the ends of the assembly, on the preferred embodiment, the end longitudinal segments of the structural support wires are attached to the longitudinal support wires.

Figure 4B:
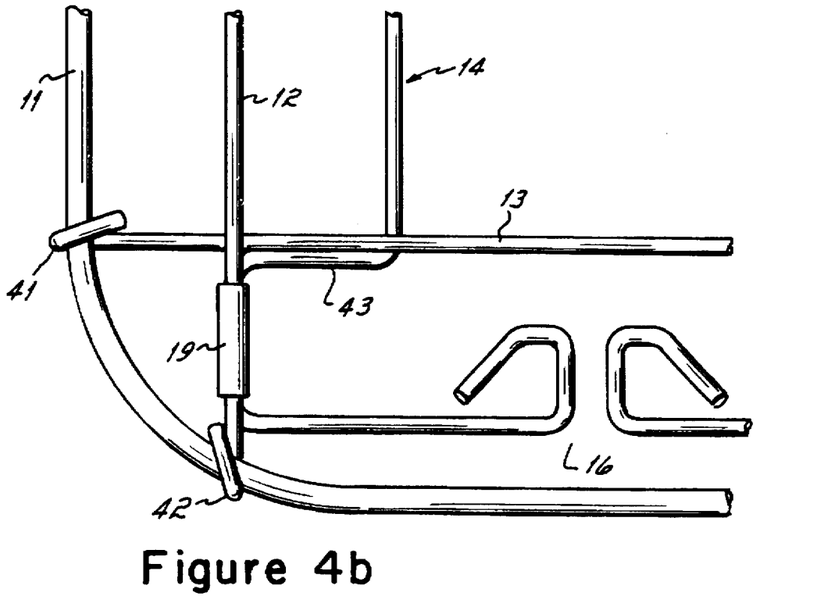
FIG. 4b is a detail showing how the end of the structural support wire is clipped to a longitudinal support wire.

FIG. 4b is a detailed view of the encircled area marked "A" in FIG. 4a. FIG. 4b shows how the ends of the lateral and longitudinal wires in the top support surface are wrapped around the rectangular border wire. The ends are wrapped such that they do not interfere with either the clips attaching the end of the structural support wire to the longitudinal and the lateral support wires in the top support surface, or the structural support wire itself. FIG. 4b also shows the ends of two adjacent structural support wires.

Figure 4C:
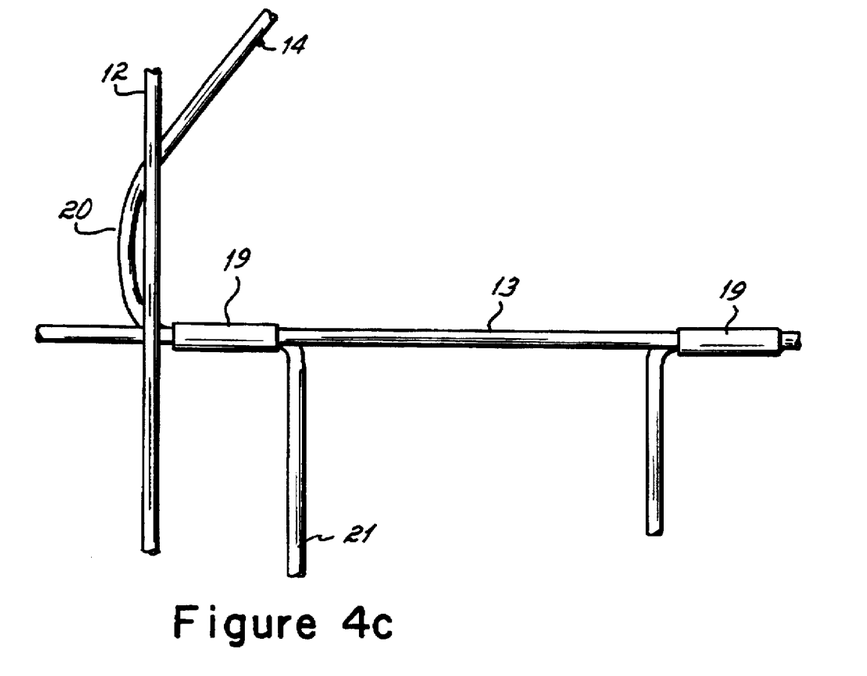
FIG. 4c is a detail showing how the structural support wire is clipped to a lateral support wire (except at its ends).

FIG. 4c is a detailed view of the encircled area marked "B" in FIG. 4a. FIG. 4c shows how the structural support wire is bent at 90° to form a short lateral segment, clipped to a lateral wire in the top support surface, then bent at 90° back in the longitudinal direction and bent downwards to form the V-shaped support member. The formed wire curves down and to the side of the longitudinal wire in the top support surface. A notch section of the structural support wire rises above the longitudinal wire in the top support surface, and captures the structural support wire in cooperation with clip 19. Lateral stability is achieved by the clip in the outward direction and by the notch in the inward direction.

Figure 5A:
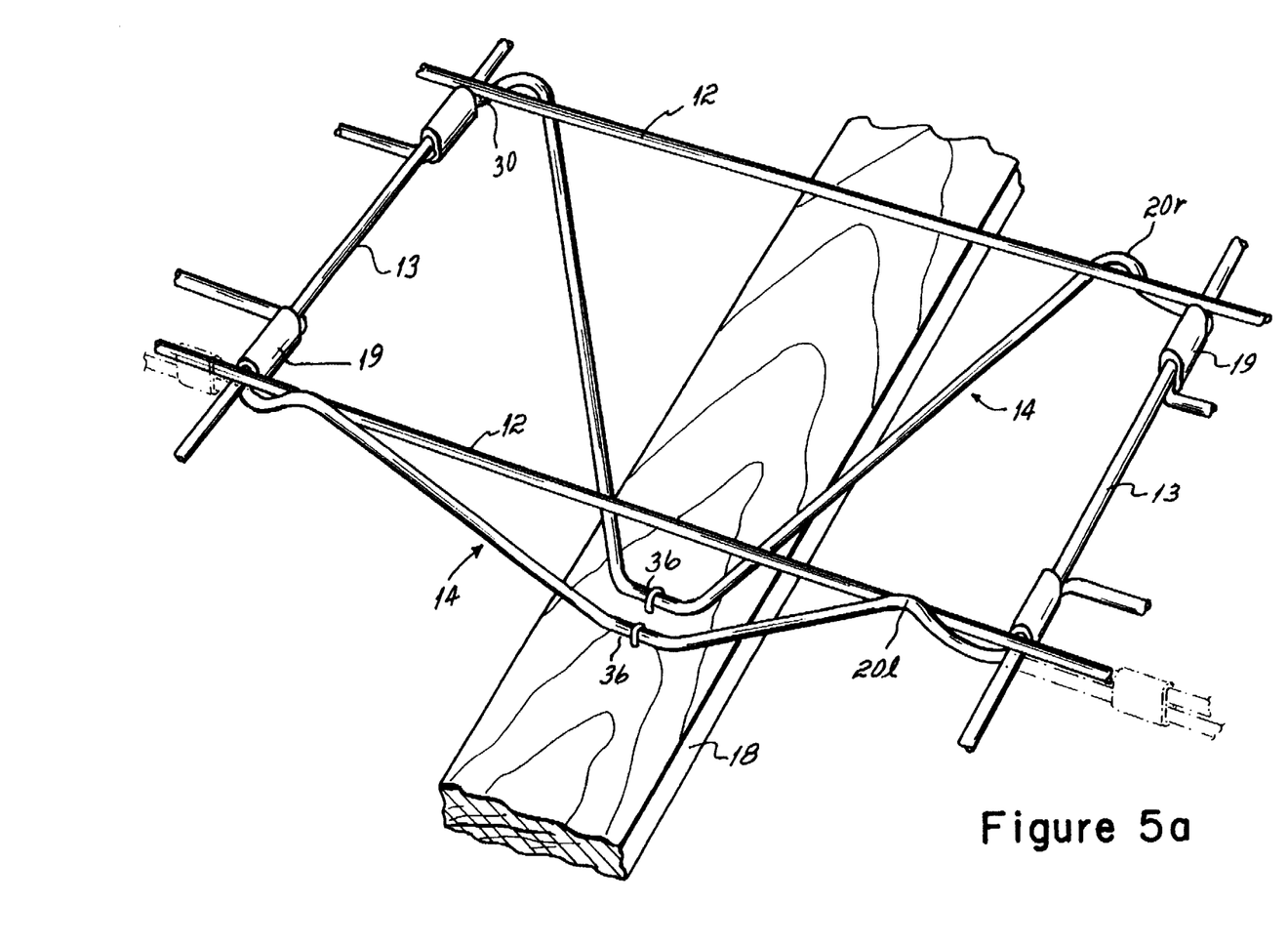
FIGS. 5a and 5b are schematic diagrams showing in perspective how the structural support wires are attached to the wooden frame in the center (FIG. 5a) and at the ends (FIG. 5b) of the formed wire.

FIG. 5a shows the upside-down pyramid structure formed by adjacent support members, and how that structure is attached to the bottom wooden frame. FIG. 5a shows that the apex of each pyramid does not actually come to a point, i.e., the ends of the Vs are actually flat (not pointed). This stabilizes and simplifies mounting the pre-assemblies to the wooden frames. Thus adjacent Vs are not brought into contact with each other, but are actually spaced apart. This space, in cooperation with the clipped grid attachment, allows some flexing of the mattress support surface, which is an improvement over unitized or welded assemblies. The flat sections allow the ends of the Vs to be attached to a slat in the bottom wooden frame, using staples or other types of fasteners. FIG. 5a also shows how the structural support wires are attached by clips to the lateral wires in the top support surface, and illustrate the lateral capturing effect of the notches.

Figure 5B:
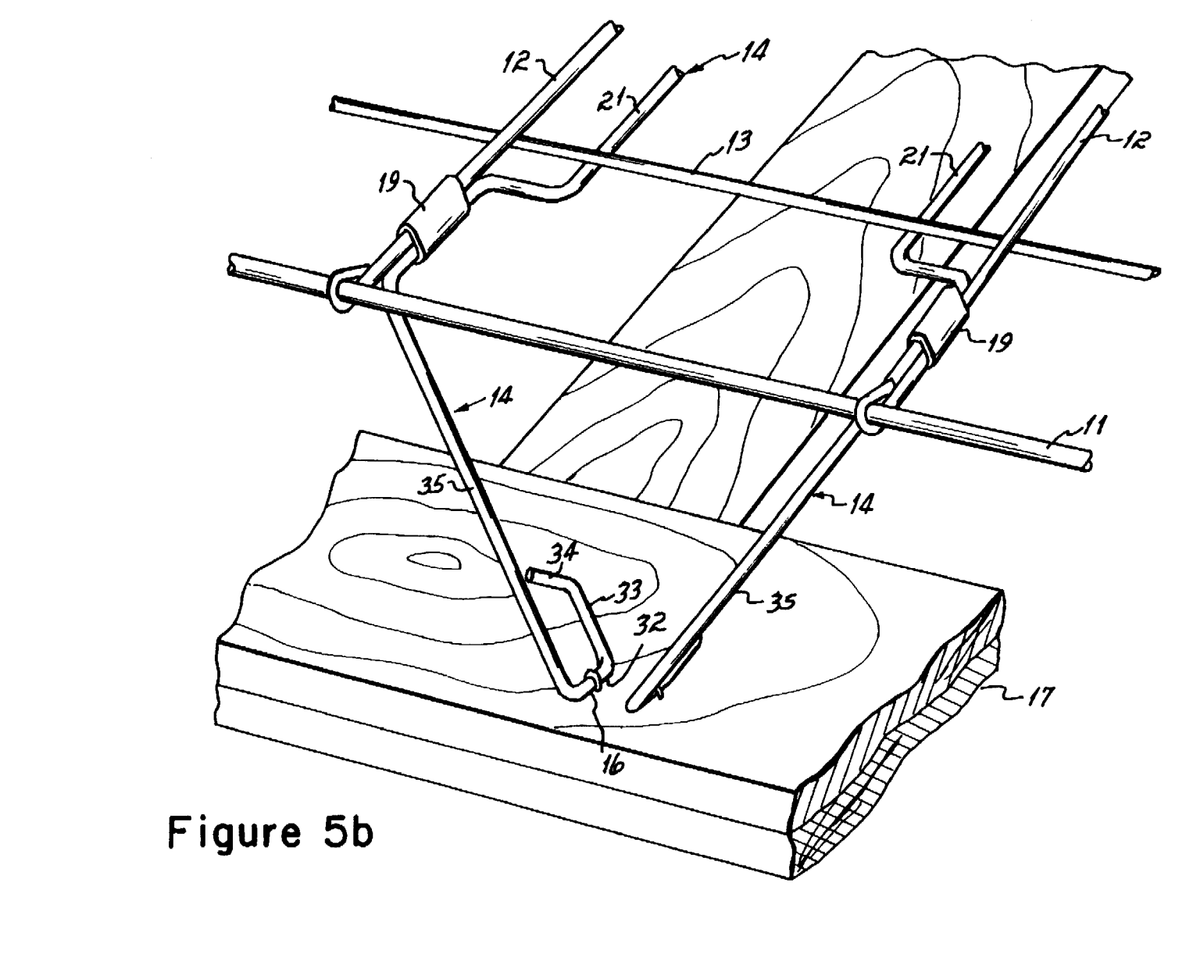

FIG. 5b shows the end of a structural support wire, as it is attached to the end of the bottom wooden frame. The end of the V-support wire is bent back up, in the plane of the V-support wire) and brought into close proximity to the downward leg of the end section, as shown in FIG. 5b. This provides a smooth, closed loop that prevents entanglement when the units are stacked and unstacked. The end of the V-support wire also has a short, flat horizontal segment, at which the end-section is stapled to the wooden frame. The FIG. 5b also shows how the structural support wires are attached to the longitudinal wires, and how they are attached to the wooden frame.

Figure 6:
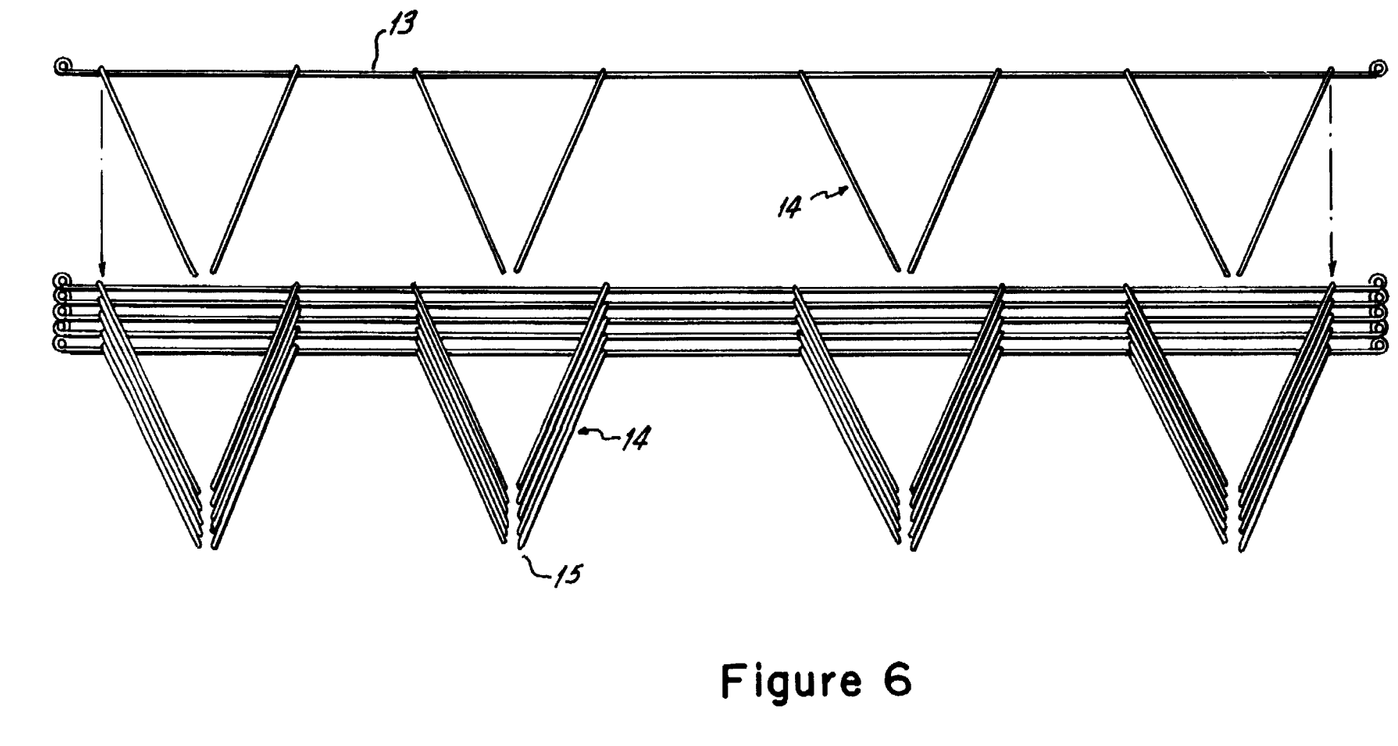
FIG. 6 is a side view showing a sixth pre-assembly being added to five stacked pre-assemblies.

FIG. 6 is an end view of five stacked pre-assemblies, as a sixth pre-assembly is being added to the stack.

Figure 7:
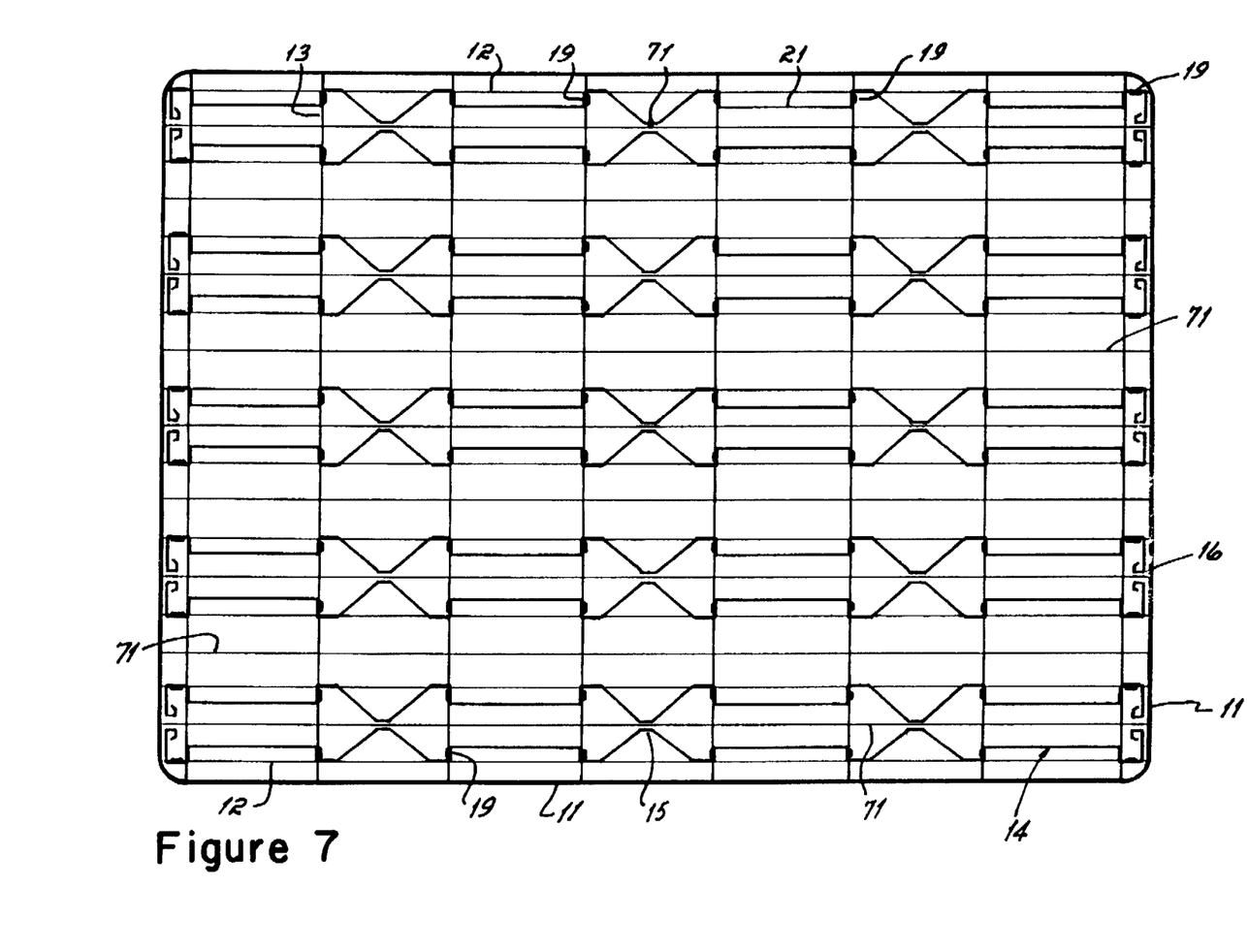
FIG. 7 is a top view of a preferred embodiment of the present invention, which has an additional longitudinal support wire placed directly above the open bay formed by the V-shaped support segments of the structural support wire.

In a second preferred embodiment of the present invention, shown in FIG. 7, an additional longitudinal support wire runs directly above the apexes of the pyramidal structure formed by the V portions of the structural support wires. The additional longitudinal support wire is parallel to and in the same plane as the other longitudinal support wires formed by the inverted pyramid structure. Because the apexes of the pyramid are open, the additional longitudinal wire slips easily in between the adjacent structural support wires, and does not prevent the pre-assemblies from being readily stacked on top of each other. The additional longitudinal support wire provides additional support to the top surface of the foundation, albeit at an additional cost in materials and labor.

These and other objects of the present invention are described in greater detail in the detailed description of the invention, the appended drawings and the attached claims.

DETAILED DESCRIPTION OF THE INVENTION

FIG. 1a is a schematic diagram showing a first box spring pre-assembly attached to wooden frame 17 and to wooden slats 18. The box spring pre-assembly includes a substantially rectangular border wire 11, longitudinal wires 12 and lateral wires 13. The lateral wires are welded to the longitudinal wires at each point that these wires intersect. The box spring pre-assembly also includes a plurality of formed wire structural support wire 14 (shown also in FIGS. 2a and 2b), which may be attached to the lateral wires 13 by clips 19. The formed wire structural support wires are attached to wooden slats 18 at the vertices 15 of the Vs in the structural support wire. It is also attached to wooden frame 17 at both ends of the structural support wire, at ends 16.

FIG. 1b is a detailed view of the encircled area in FIG. 1a, showing how the structural support wire is bent at 90° for a short lateral segment. The lateral segments of the structural support wire are attached to lateral wires 13 using clips 19, as shown in FIG. 4c. However, as shown in FIG. 4b, the ends of the structural support wire are attached to a longitudinal wire, not to a lateral wire.

FIGS. 2a and 2b are schematic diagrams of structural support wires 14 for a three-slat foundation and for a four-slat foundation, respectively. FIGS. 2a and 2b show the ends 16 of the structural support wires, and the vertices 15 of the structural support wires. The structural support wire is attached to the wooden frame and to the slats of the foundation at ends 16 and vertices 15, respectively. In the preferred embodiment of the present invention, curved segments or notches 20 of the structural support wires are formed such that they rise slightly above the longitudinal and lateral support wires (as shown in FIGS. 1b and 4a–4c). This restricts lateral movement of the structural support wire by trapping the fixed longitudinal wire between clip 19 and notch 20.

FIGS. 3a and 3b are perspective views of a portion of a structural support wire 14, showing the ends 16, the vertices 15, the short lateral segments 30 and the notches 20. FIG. 3a provides a good view of the inverted pyramid structure formed by the V portions of the structural support wire. FIG. 3b shows how the two adjacent structural support wires are angled towards each other, such that the plane of the structural support wires form oppositely-directed angles that are substantially less than 90°, preferably about 45° to about 75°, even more preferably about 60° to about 70°, with respect to the top support surfaces.

FIG. 4a is a top view of the box spring pre-assembly showing the rectangular border wire 11, longitudinal wires 12, lateral wires 13, structural support wires 14, the vertices 15 of the structural support wires and the ends 16 of the structural support wires. FIG. 4a shows that the vertices 15 of two adjacent structural support wires 14 do not actually come in contact with each other. The distance between two adjacent vertices is typically about three-quarters of an inch. However, it can be varied according to the particular requirements of the foundation.

FIG. 4b is an enlarged view of the circular area marked "A" in FIG. 4a. It shows how the end of the structural support wire is attached to a longitudinal support wire 12 by clip 19. Each end 41 of a lateral support wire, or end 42 of a longitudinal support wire, is bent over rectangular border wire 11 from below, firmly attaching the support wires to the rectangular border wire.

FIG. 4c is an enlarged view of the circular area marked "B" in FIG. 4a. It shows how, except at the ends of the structural support wire, short lateral segments of the structural support wire are attached to the lateral support wires 13 by clips 19. FIG. 4c also shows a notch 20, which rises above longitudinal wire 12, ensuring that the structural support wire cannot slide along the lateral support wire.

As shown in FIG. 4a, notches 20 on adjacent structural support wires are located on alternate sides of the longitudinal wires (i.e., as shown in FIG. 4a, if notch 20l is to the left of its longitudinal wire, notch 20r is to the right of its longitudinal wire). This configuration of alternate left and right notches, and clips securing the structural support wire to the lateral support wires, ensures the rigidity and stability of the formed wire foundation.

In an alternate embodiment of the present invention as shown in phantom in FIG. 5a, the structural support wires do not include lateral segments. In that embodiment, the structural support wires are clipped to the longitudinal support wires. The notches along each structural support wire rise up on alternate sides of the longitudinal support wire, to fix the angular position of the structural support wire relative to the support surface, by physically contacting the underside of the lateral support wire.

FIG. 5a is a perspective view of two adjacent structural support wires 14, showing how the structural support wires are secured to a wooden slat 18 at short flat segments 36 using, e.g. staples, and to lateral support wires 13 using clips 19. Clips 19 allow a limited rotation of the lateral segments 30 of the structural support wire. The limited rotation within the clips, and the use of spring wire for the structural support wire results in a top support surface that is not completely rigid, i.e., a support surface that is flexible enough to form limited contours and to flex in response to applied loads.

The length and positioning of lateral segments 30, and the angle the V sections form with the top support surface, determine the position of flat segments 36 on slats 18. The distance between two adjacent segments 36 is preferably 0.5 to 1.0 inches. For the second preferred embodiment of the present invention, discussed below with reference to FIG. 7, the space between adjacent segments 36 must be sufficient to allow the structural support wires to slide readily on either side of additional longitudinal support wires 71 (shown in FIG. 7).

In FIG. 5a, notches 20l and 20r are shown rising slightly above longitudinal wires 12, on alternating sides of the longitudinal wires 12, i.e., notch 20l is on the left of the longitudinal wire immediately next to it, and notch 20r is on the right of the longitudinal wire immediately next to it.

FIG. 5b is a perspective view of two adjacent structural support wires 14, at one end of the pre-assembly, showing how the structural support wires are secured to wooden frame 17 using, e.g., staples, to secure short, flat segments 32 of the end sections 16 to the wooden frame, and clips 19 to secure the structural support wire to longitudinal support wires 12. End sections 16 also include a second short segment 33, and a closing segment 34. Segments 32, 33 and 34 form a substantially closed, roughly oblong loop. As shown by FIG. 5b, segment 32 can be stapled to the wooden frame using a stapling machine that accesses segment 32 from directly above. The loop formed by segments 32, 33 and 34 must be substantially closed, i.e., the size of the opening left between the end of closing segment 34 and the downward leg 35 of V-support wire 14 must be less than one-half the diameter of the structural support wire, so that succeeding pre-assemblies cannot get entangled by end sections 16. FIG. 5b also shows how the longitudinal wires are attached to rectangular border wire 11, by bending longitudinal wire 12 over and around border wire 11. Lateral support wires 13 are similarly attached to rectangular border wire 11.

FIG. 6 is an end view of five stacked pre-assemblies, showing a sixth pre-assembly being added to the stack. FIG. 6 shows the "V" portions of structural support wires 14 extending down towards the support frame (not shown in FIG. 6). FIG. 6 also shows that the vertex of each "V" is open.

FIG. 7 is a schematic diagram of a second preferred embodiment of the present invention. The second preferred embodiment differs from the first preferred embodiment by having an additional set of longitudinal support wires 71. Longitudinal support wires 71 are co-planar with longitudinal wires 12, but are positioned directly above the apex of the four-sided pyramid structures formed by the "V" portion of the structural support wire. Because the vertices of the Vs are open (as shown in FIGS. 3a, 3b, 5a, 5b and 6), additional longitudinal support wires 71, if used, do not affect the stackability of the box spring pre-assemblies.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A nestably stackable box spring pre-assembly comprising:
   (a) a substantially rectangular border wire having two ends and two sides defining a top support surface;
   (b) a plurality of lateral surface support wires extending across the top support surface attached at each end to one side of the substantially rectangular border wire;

(c) a plurality of longitudinal surface support wires extending along the length of the top support surface attached at each end to one end of the substantially rectangular border wire, and intersecting the lateral surface support wires to form intersection points, wherein each of the longitudinal surface support wires is attached to at least one of the plurality of lateral surface support wires at an intersection point;

(d) a plurality of pairs of adjacent structural support wires, each structural support wire having
  (i) two end sections,
  (ii) at least one V section,
  (iii) a plurality of lateral sections and
  (iv) a plurality of offset longitudinal sections,
said structural support wires extending substantially from one end of the substantially rectangular border wire to the other end of the substantially rectangular border wire; and (e) a plurality of means for rigidly attaching the lateral sections of the structural support wire to the lateral surface support wires, wherein the V sections of each structural support wire are contained within a common plane, the V section containing common planes of adjacent structural support wires extending downwardly and inwardly toward one another from said rod support surface such that the vertices of the V sections of a pair of adjacent support wires are close to but not in contact with the vertices of the adjacent structural support wire of said pair and such that adjacent V sections in one pair of structural support wires form an open apex pyramidal structure.

2. The nestably stackable box spring pre-assembly of claim 1, wherein the means for rigidly attaching the lateral sections of the structural support wires to the lateral surface support wires are clips.

3. The nestably stackable box spring pre-assembly of claim 1, wherein each structural support wire is attached to one of the longitudinal surface support wires at each end of the structural support wire.

4. The nestably stackable box spring pre-assembly of claim 1, wherein the length of each offset longitudinal section is substantially equal to the distance between two adjacent lateral surface support wires.

5. The nestably stackable box spring pre-assembly of claim 1, wherein the structural support wires further comprise notch sections, said notch sections being formed such that each notch section curves up along the side of a longitudinal surface support wire and rises slightly above the longitudinal and lateral support wires.

6. The nestably stackable box spring pre-assembly of claim 5, wherein the notches in a pair of adjacent structural support wires curve up on alternate sides of adjacent longitudinal surface support wires.

7. The nestably stackable box spring pre-assembly of claim 1, wherein the end sections extend downwardly at an angle of substantially 90° from the top support surface.

8. The nestably stackable box spring pre-assembly of claim 1, wherein each end section comprises a substantially closed loop end portion.

9. The nestably stackable box spring pre-assembly of claim 1, wherein the common plane containing the V sections of each structural support wire extends down from the top surface at an angle that ranges from about 45° to about 75°.

10. The nestably stackable box spring pre-assembly of claim 1, further comprising an additional plurality of longitudinal surface support wires, said additional longitudinal surface support wires being positioned directly above the open apexes of the pairs of adjacent structural support wires.

11. The nestably stackable box spring pre-assembly of claim 1, wherein each V section has a short flat section at the vertex of the V section.

12. The nestably stackable box spring pre-assembly of claim 1, wherein each structural support wire comprises three V sections.

13. The nestably stackable box spring pre-assembly of claim 1, wherein each structural support wire comprises four V sections.

14. A structural support wire for a box spring foundation comprising:
  (a) two end sections wherein each end section comprises a substantially closed loop portion;
  (b) a plurality of V sections located between said end sections, each V section having a short flat segment at its vertex and lying in a common plane;
  (c) a plurality of relatively short lateral sections; and
  (d) a plurality of relatively long offset longitudinal sections.

15. The structural support wire of claim 14, wherein the structural support wire has three V sections.

16. The structural support wire of claim 14, wherein the structural support wire has four V sections.

17. A stack of box spring pre-assemblies comprising:
  (a) one bottom pre-assembly comprising:
    (i) a substantially rectangular border wire having two ends and two sides defining a support surface for the bottom pre-assembly;
    (ii) a plurality of lateral surface support wires, extending across the support surface of the bottom pre-assembly, attached at each end to one side of the substantially rectangular border wire;
    (iii) a plurality of longitudinal surface support wires extending along the length of the support surface of the bottom pre-assembly, attached at each end to one end of the substantially rectangular border wire, and intersecting the lateral surface support wires to form intersection points, wherein each of the longitudinal surface support wires is attached to at least one of the plurality of lateral surface support wires at an intersection point;
    (iv) a plurality of pairs of adjacent structural support wires, each structural support wire having two end sections, at least one V section, a plurality of lateral sections and a plurality of offset longitudinal sections, said structural support wires extending substantially from one end of the substantially rectangular border wire to the other end of the substantially rectangular border wire;
    (v) a plurality of means for rigidly attaching the lateral sections of the structural support wire to the lateral surface support wires,
    (vi) a frame having two ends and two sides positioned directly below the two ends and two sides of the substantially rectangular border wire, and having a plurality of slats, wherein the bottom of the end sections of the structural support wires are rigidly attached to the ends of the frame, and the bottom of each at least one V section of the structural support wires is rigidly attached to the slats;
  wherein the V sections of each structural support wire are contained within a common plane, the V section containing common planes of adjacent structural support wires extending downwardly and inwardly toward one another from said top support surface such that the vertices of the V sections of a pair of adjacent support wires are close to but not in contact with the vertices of the adjacent structural support wire of said pair and such that adjacent V sections in one pair of bottom structural support wires form an open-apex pyramidal structure; and (b) at least one additional pre-assembly comprising:
   (i) an additional substantially rectangular border wire having two ends and two sides defining an additional top support surface;
   (ii) a plurality of additional lateral surface support wires extending across the additional top support surface attached at each end to one side of the additional substantially rectangular border wire;
   (iii) a plurality of additional longitudinal surface support wires extending along the length of the additional top support surface attached at each end to one end of the additional substantially rectangular border wire, and intersecting the additional lateral surface support wires to form intersection points, wherein each of the additional longitudinal surface support wires is attached to at least one of the plurality of additional lateral surface support wires at an intersection point;
   (iv) a plurality of pairs of adjacent additional structural support wires, each additional structural support wire having two end sections, a plurality of V sections, a plurality of lateral sections and a plurality of offset longitudinal sections, said additional structural support wires extending substantially from one end of the additional substantially rectangular border wire to the other end of the additional substantially rectangular border wire; and
   (v) a plurality of means for rigidly attaching the additional lateral sections of the additional structural support wire to the additional lateral surface support wires, wherein the V sections of each additional structural support wire are contained within a common plane, the V section containing common planes of adjacent additional structural support wires extending downwardly and inwardly toward one another from said additional top support surface such that the vertices of the V sections a pair of adjacent additional support wires are close to but not in contact with the vertices of the adjacent additional support wire of the pair, and such that adjacent V sections in one pair of additional structural support wires form a open-apex pyramidal structure, and wherein each additional pre-assembly is stacked sequentially on top of the bottom pre-assembly.

18. A box spring assembly comprising:
(a) a substantially rectangular border wire having two ends and two sides defining a top support surface;
(b) a plurality of lateral surface support wires extending across the top support surface attached at each end to one side of the substantially rectangular border wire;
(c) a plurality of longitudinal surface support wires extending along the length of the top support surface of the box spring assembly attached at each end to one end of the substantially rectangular border wire, and intersecting the lateral surface support wires to form intersection points, wherein each of the longitudinal surface support wires is attached to at least one of the plurality of lateral surface support wires at an intersection point;
(d) a plurality of pairs of adjacent structural support wires, each structural support wire having two end sections, at least one V section, a plurality of lateral sections and a plurality of offset longitudinal sections, said structural support wires extending substantially from one end of the substantially rectangular border wire to the other end of the substantially rectangular border wire;

(e) a plurality of means for rigidly attaching the lateral sections of the structural support wire to the lateral surface support wires;

(f) a frame having two ends and two sides positioned directly below the two ends and two sides of the substantially rectangular border wire, and also having a plurality of slats, wherein the bottom of the end sections of the structural support wires are attached to the ends of the frame, and the bottom of each V section of the structural support wires is attached to a slat, and wherein the V sections of each structural support wire are contained within a common plane, the V section containing common planes of adjacent structural support wires extending downwardly and inwardly toward one another from said top support surface such that the vertices of the V sections of a pair of adjacent support wires are close to but not in contact with the vertices of the adjacent structural support wire of said pair and such that adjacent V sections in one pair of structural support wires form a open-apex pyramidal structure.

19. The box spring assembly of claim 18, wherein the means for rigidly attaching the lateral sections of the structural support wires to the lateral surface support wires are clips.

20. The box spring assembly of claim 18, wherein each structural support wire is attached to one of the longitudinal surface support wires at each end of the structural support wire.

21. The box spring assembly of claim 18, wherein the length of each offset longitudinal section is substantially equal to the distance between two adjacent lateral surface support wires.

22. The box spring assembly of claim 18, wherein the structural support wires further comprise notch sections, said notch sections being formed such that each notch section curves up along the side of a longitudinal surface support wire and rises slightly above the longitudinal and lateral support wires.

23. The box spring assembly of claim 18, wherein the notches in a pair of adjacent structural support wires curve up on alternate sides of adjacent longitudinal surface support wires.

24. The box spring assembly of claim 18, wherein the end sections extend downwardly at an angle of substantially 90° from the top support surface.

25. The box spring assembly of claim 18, wherein each end section comprises a substantially closed loop end portion.

26. The box spring assembly of claim 18, wherein the common plane containing the V sections of each structural support wire extends down from the top support surface at an angle ranging from about 45° to about 75°.

27. The box spring assembly of claim 18, further comprising an additional plurality of longitudinal surface support wires, said additional longitudinal surface support wires being positioned directly above the open apexes of the pyramidal structures.

28. The box spring assembly of claim 18, wherein each V section has a short flat section at the vertex of the V section.

29. A nestably stackable box spring pre-assembly comprising:
(a) a substantially rectangular border wire having two ends and two sides defining a planar top support surface;

(b) a plurality of surface support wires including:
  (i) lateral surface support wires extending across the top support surface attached at each end to one side of the substantially rectangular border wire, and
  (ii) a plurality of longitudinal surface support wires extending along the length of the top support surface attached at each end to one end of the substantially rectangular border wire, and intersecting the lateral surface support wires to form intersections points, wherein each of the longitudinal surface support wires is attached to substantially all of the plurality of lateral surface support wires at an intersection point;
(c) a plurality of pairs of adjacent structural support wires, each structural support wire having two end sections, a plurality of notch sections and a plurality of V sections, said structural support wires extending substantially from one end of the substantially rectangular border wire to the other end of the substantially rectangular border wire, said notch sections rising above said longitudinal surface support wires; and
(d) a plurality of means for rigidly attaching the structural support wires to the surface support wires,
wherein the V sections of each structural support wire are contained within a common plane, the V section containing common planes of adjacent structural support wires extending downwardly and inwardly toward one another from said top support surface such that the vertices of the V sections of a pair of adjacent support wires are close to but not in contact with the vertices of the adjacent structural support wire of said pair and such that adjacent V sections in one pair of structural support wires form an open apex pyramidal structure.

30. The nestably stackable box spring pre-assembly of claim 29, wherein the means for rigidly attaching the structural support wires to the surface support wires are clips.

31. The nestably stackable box spring pre-assembly of claim 29 wherein said notches are in physical contact with the lateral support wires.

32. The nestably stackable box spring pre-assembly of claim 29, wherein the end sections comprise a substantially closed end portion.

33. The nestably stackable box spring pre-assembly of claim 29, further comprising an additional plurality of longitudinal surface support wires, said additional longitudinal surface support wires being positioned directly above the apex of the four-sided pyramidal structure formed by adjacent V sections.

34. The nestably stackable box spring pre-assembly of claim 29, wherein each V section has a short flat section at the vertex of the V section.

35. The nestably stackable box spring pre-assembly of claim 29, further comprising a frame having two ends and two sides, having a plurality of slats extending laterally from one side of the frame to the other side of the frame, wherein the bottom of the end sections of the structural support wire are rigidly attached to the ends of the frame, and the bottom of the V sections of the structural support wire are attached to the slats.

* * * * *

UNITED STATES PATENT AND TRADEMARK OFFICE
CERTIFICATE OF CORRECTION

PATENT NO. : 5,704,595
DATED : January 6, 1998
INVENTOR(S) : John P. Kitchen and Upton Dabney It is certified that error appears in the above-indentified patent and that said Letters Patent is hereby corrected as shown below:

In column 1, line 11, change "cots" to ---coils---.

In column 4, line 35, after "pre-assembly", insert ---10---.

In column 7, line 24, change "rod" to ---top---.

Signed and Sealed this

Twelfth Day of May, 1998

Attest:

BRUCE LEHMAN

Attesting Officer

Commissioner of Patents and Trademarks